United States Patent [19]

Kempter

[11] Patent Number: 5,744,553

[45] Date of Patent: Apr. 28, 1998

[54] METHOD AND DEVICE FOR THE PREPARATION OF A CROSSLINKED EXTRUDED POLYMERIC PRODUCT

[75] Inventor: Werner Kempter, St. Margrethen, Switzerland

[73] Assignee: Bernhard Rustige GmbH & Co. KG, Bremen, Germany

[21] Appl. No.: 535,164

[22] PCT Filed: Apr. 14, 1994

[86] PCT No.: PCT/EP94/01152

§ 371 Date: Dec. 12, 1995

§ 102(e) Date: Dec. 12, 1995

[87] PCT Pub. No.: WO94/25509

PCT Pub. Date: Nov. 10, 1994

[30] Foreign Application Priority Data

Apr. 23, 1993 [DE] Germany .................. 43 13 290.1

[51] Int. Cl.[6] ........................................ C08F 8/00
[52] U.S. Cl. .......................................... 525/333.8
[58] Field of Search ............................. 525/333.8

[56] References Cited

U.S. PATENT DOCUMENTS 4,703,093  10/1987  Thurman ................... 525/387

*Primary Examiner*—Edward J. Cain
*Attorney, Agent, or Firm*—Marshall, O'Toole, Gerstein, Murray & Borun

[57] ABSTRACT

Described is a method of extruding a cross-linked polymer, the method calling for the polymer to be cross-linked to be extruded in granular or powder form with liquid additives. The method is characterized in that a granular or powder-form polymer with a fissured, porous surface is used. This granular/powder-form polymer with an irregular surface structure is fed through a feed line to a mixing zone by injecting at least one liquid cross-linking additive and subsequently extruding the mixture in an extrusion press. Obtained during this extrusion is improved distribution of the liquid over the polymeric particles, more uniform grafting of the cross-linking agent on to the polymer and hence, a homogeneously cross-linked product.

19 Claims, 2 Drawing Sheets

METHOD AND DEVICE FOR THE PREPARATION OF A CROSSLINKED EXTRUDED POLYMERIC PRODUCT

BACKGROUND OF THE INVENTION

The invention is concerned with a method for the preparation of a crosslinked, extruded polymeric product whereby the polymer to be crosslinked is processed in the granulate or powder form with liquid additives while undergoing extrusion; the invention also concerns apparatus for carrying out the process.

A process and a device for the preparation of a crosslinked, extruded polymeric product is known from DE-OS 25 54 525, in which the polymer to be crosslinked is introduced through an extruder-feeding hopper of a screw extruder, and the other components necessary for further crosslinking are injected either into the lower part of the feeding hopper or directly into the neck part of the extruder.

For complete and uniform transverse crosslinking of the polymer, it is important to achieve sufficient mixing of all the components. However, this type of mixing has not yet been satisfactorily achieved with the devices available so far. Mere injection of certain components into the polymer located in the extruder-feeding hopper or in the neck of the extruder permits only achieving a high additive concentration in and around the injection point. Subsequently, the reaction mixture must be mixed in the extruder with the aid of an expensive extruder screw and even during homogenization. Thus, the conditions for good crosslinking are unfavorable and, moreover, an extruder screw is necessary, which is complicated and can be produced only at great expense.

Furthermore, it has been shown that when processing a conventional synthetic polymer granulate by injecting the additive necessary for crosslinking produces insufficient surface wetting of the granulate, which results in severe disadvantages. Although experiments were carried out to avoid these disadvantages, by providing a mixer before introducing the material into the extruder screw in order to achieve favorable mixing and wetting of the granulate, it was shown that the granulate commonly used is difficult to wet because of its smooth surface and because of its relatively large volume. The disadvantage resulting from this is that the liquid components are transported separately from the polymer granulate in the extruder screw all the way to the melting phase which will lead to local accumulation of liquid and thus to concentration differences, which finally has a strong adverse influence on the homogeneity of the material prepared from it.

A further developed process for the processing and crosslinking of a polymer with other substances is described in U.S. Pat. No. 4,703,093. Here, the polymer is finely ground and heated in order to increase the surface and to form gaps in the surface. As a result of this grinding and heating, the absorbing ability of the polymer for the crosslinking substances is increased. Cooling occurs after mixing the polymer granulate with the crosslinking substances.

In this further developed process, too, the mixing of the polymer with the additives or crosslinking substances is still insufficient, even though the material mixture is heated to increase reactivity in order to achieve better mixing of the substances.

SUMMARY OF THE INVENTION

Therefore, the task of the invention is to further develop a method and a device of the type mentioned at the outset so that better wetting of the granulate and thus better mixing is achieved before melting.

In order to solve this task, the method according to the present invention for the preparation of a crosslinked, extruded polymeric product, in which the polymer to be crosslinked is processed with liquid additives by extrusion, is characterized by the fact that a polymeric granulate or polymeric powder with a fissured, porous surface is used.

Preferably, polyethylene is used for crosslinking. It is especially favorable to use a polymer granulate/polymer powder, especially a polyethylene, with a density of about 0.89 to 1 $g/cm^3$. The grain size of the polymer material is expediently about 10 µm to 2 mm.

In carrying out the method, the polymer granulate/polymer powder to be crosslinked, having a fissured, porous surface, is introduced through the inlet device of a mixing zone, into which at least one liquid additive is injected for crosslinking the polymer, and the mixture is processed in a subsequent injection extrusion press device.

Moreover, an advantage of this process is that, in addition to the liquid additive, other liquid substances can be introduced, for example, stabilizers and the like.

In a special embodiment, the polyethylene material with fissured, porous surface is crosslinked with the addition of a hydrolyzable, unsaturated silane through a silanol condensation reaction.

However, crosslinking of the polyethylene material can be accomplished not only with a silane, but, according to the invention, the polyethylene material can also be crosslinked with a free radical reaction with the addition of a peroxide.

By using a polymer granulate/polymer powder with a fissured, porous surface, there is an absorbent, open-pore, large surface available to liquid additives introduced into the system, the liquid being able to penetrate into this surface and thus optimum mixing is ensured. The polymer granulates so far used had a smooth surface and a relatively large particle size, without any absorbing ability and therefore they were difficult to wet. Thus, in the crosslinking reaction of polymers using the usual granulates with smooth surface and also relatively large grain size, in the range from 3 to 4 mm, the liquid that was introduced into the extruder was even pressed out resulting in impermissible concentration differences.

The novel polymeric material with fissured, highly liquid-absorbent surface according to the present invention is a granulate or powder, which is produced by a special polymerization process. Preferably, the material consists of polyethylene or other polymeric olefins or their modified products. Such polymeric granulates/polymer powders are sold, for example, by the company Montecatini under the name "Spherilene". Such polymers are produced, for example, using a fluidized-bed gas-phase reactor with subsequent degassing, removing all the monomer components, and are used in the process of the invention without the conventional pelletization measures (which leads to a smooth, round surface). Thus, according to the conventional concepts, the material is a preproduct, but it can be used directly in the present process, which results in further advantages with regard to saving of additional processing measures and costs.

Due to the irregular, absorbent, open-pore and highly liquid-absorbent surface of the material to be crosslinked, which is ideally suitable to bind the liquid to itself and transport it, there is an additional advantage that a smaller amount of liquid additive needs to be added than was necessary when using the conventional, smooth polymer granulates. As a result of the special nature of the surface structure of the polymeric material used according to the invention, better uptake of the liquid into the granulate is provided and thus better distribution is achieved and no liquid is lost.

A further aspect of the present invention provides, for reasons of savings of cost or process-technological reasons, that not only the polymer granulate/polymer powder with porous surface according to the invention be used, but a porous polymer granulate according to the invention and conventional, not fissured polymeric material be used in an arbitrary mixing ratio. Thus, depending on the requirements, one can use a starting material which contains only a certain percentage of fissured, porous polymeric material.

A device consisting of an inlet device for the polymeric material and an inlet device for at least one additive and an extrusion press device are suitable for carrying out the process according to the invention, whereby a mixing device 4 is provided between inlet device 3 for the polymer granulate/polymer powder and extrusion press device 2, this mixing device opening into an inlet device 5, 6, 7 for at least one liquid additive.

An inlet connection 18 can be provided instead of mixing device 4.

BRIEF DESCRIPTION OF THE DRAWINGS

The following drawings serve for further explanation of the invention. In these.

DESCRIPTION OF PREFERRED EMBODIMENTS

Figure 1:
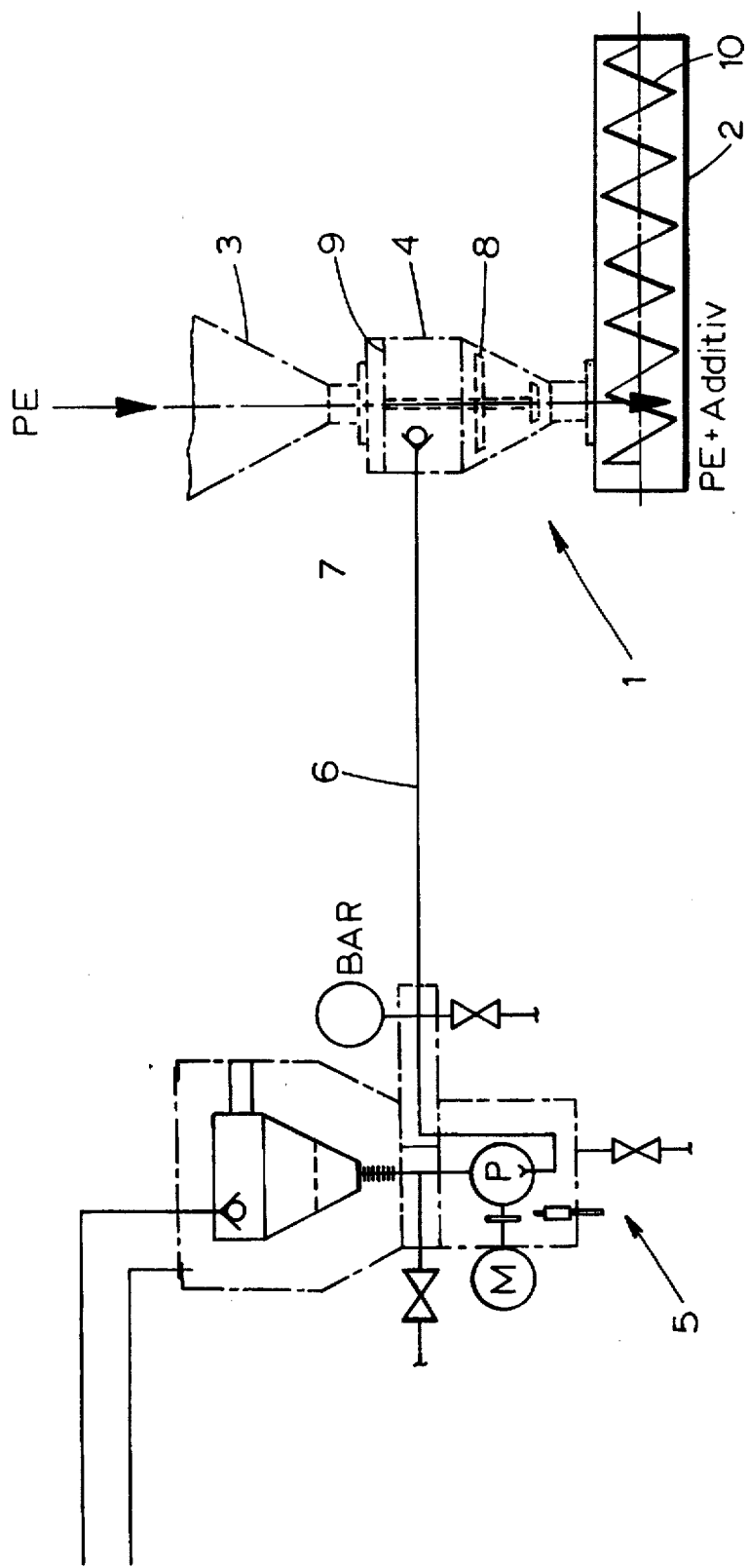
FIG. 1 shows schematically a device according to a first embodiment for carrying out the process according to the invention.

FIG. 1 shows schematically the structure of the extruder device 1 according to the invention, with a screw extruder 2, a feeding hopper 3 arranged above extruder 2 for containing the polymer granulate/polymer powder with fissured porous surface (preferably polyethylene), and a mixer 4 arranged between feeding hopper 3 and extruder 2. An inlet line 6 coming from metering pump unit 5 opens into mixer 4. This line is for the liquid additive to be injected (preferably a silane solution), which is introduced into mixer 4 through an injection nozzle 7.

A stirring rod 8 is arranged inside container 4. This can be driven through drive 9. The screw extruder 2 is an extruder customarily employed for the extrusion of synthetic polymers and it has a total screw ratio of length to diameter of approximately 26:1. The polymer reaction mixture to be processed is introduced directly into screw extruder 2 from mixer 4 above, in the form of an optimal premix.

Figure 2:
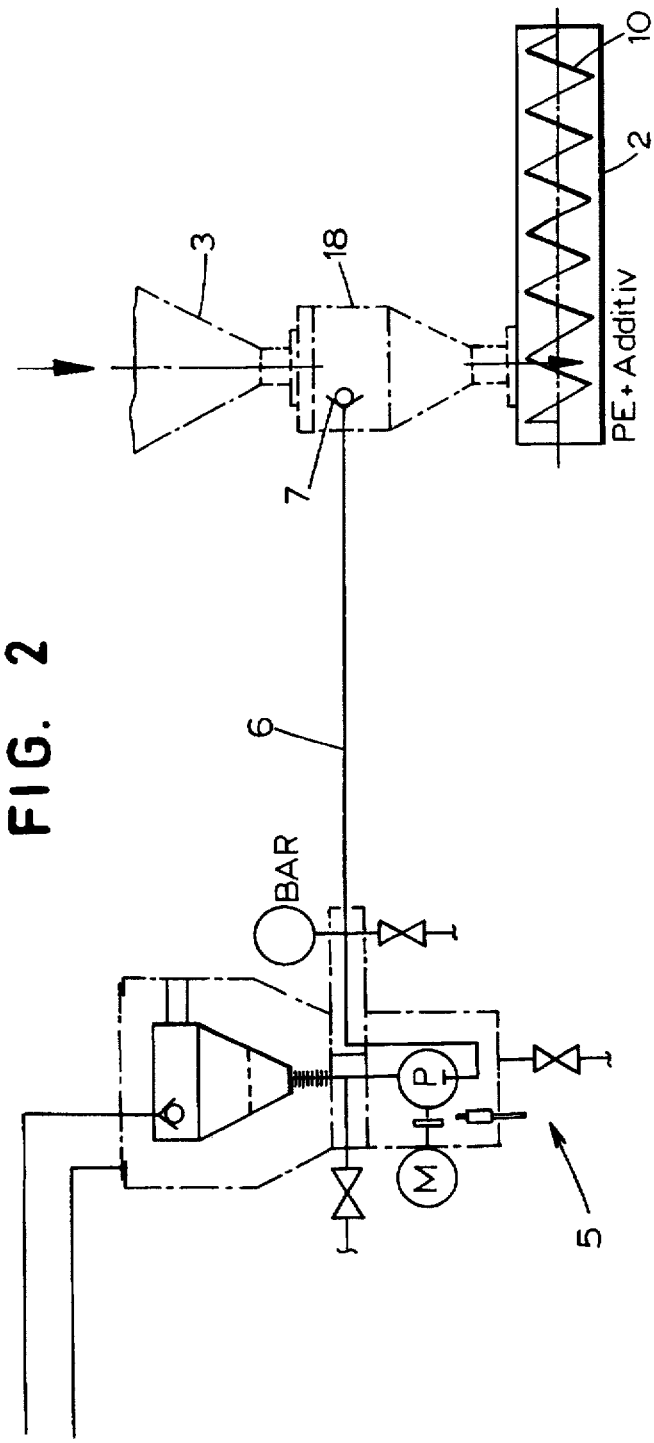
FIG. 2 shows schematically a modified embodiment of the device according to FIG. 1.

FIG. 2 is a variation of this embodiment according to which the liquid additives transported from the metering pump unit 5 through inlet line 6 are injected directly to an inlet connection 18 arranged below feeding hopper 3.

Figure 3:
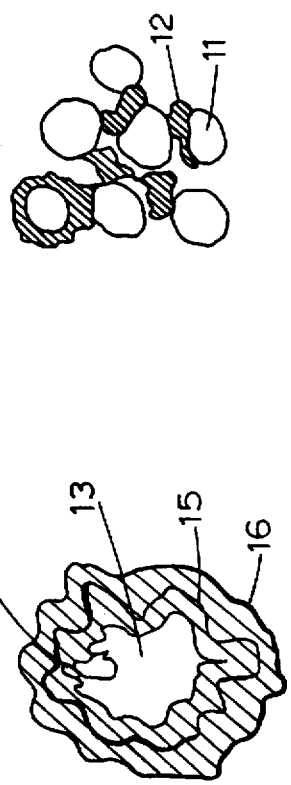
FIG. 3 shows the arrangement of liquid and granulate grains according to the state of the art.

FIG. 3 shows the liquid distribution on the polymer granulate grain 11 according to the state of the art. It can be seen from this that the relatively large granulate grains 11 with smooth surface are exposed to liquid 12. The smooth surface of the granulate is not suitable for binding liquid 12, which therefore accumulates more liquid in the spaces between granulate grains 11 and a lesser amount of liquid on the surface of the grains. As a consequence, the known disadvantages arise, which were described above, and involve insufficient mixing and concentration differences.

Figure 4:
FIG. 4 shows the arrangement of liquid and polymer grains according to the invention.

FIG. 4 shows the arrangement of the fissured polymer grains 13 used according to the invention, wetted with liquid 14. The granulate grains or powder grains 13, which are significantly smaller in comparison to conventional granulates, have an irregular surface, so that liquid 14 is distributed optimally around polymer grains 13 and, in this way, on the one hand, liquid 14 is transported with the polymer grain in the intermediate spaces and, on the other hand, is infiltrated in the polymer grain itself and taken up or absorbed there.

Figure 5:
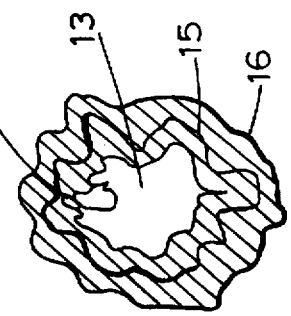
FIG. 5 is an enlarged representation of a polymer grain according to the invention, in cross-section.

This is illustrated especially clearly in FIG. 5, which shows a cross-section through a polymer grain 13. Below the irregular surface, that is, within the polymer grain 13, the liquid forms a liquid infiltration boundary 17. Based on this bonding, the liquid is attached optimally to surface 15 and forms an outer liquid surface 16. Thus, finely distributed attachment of the liquid to the polymer grain occurs, which could not be achieved by conventional processing.

When carrying out the process according to the invention, the liquid injected into the mixer 4 or into the inlet connection 18 becomes mixed with the polymer granulate/polymer powder having fissured and irregularly structured and enlarged surface coming from the feeding hopper. Optimum attachment of the liquid to the grains occurs and then the mixture is introduced into the screw extruder 2 in the finely divided form where further processing occurs with intimate mixing of the entire material.

The optimum distribution of liquid resulting from the present invention leads to a more uniform grafting during the processing before the crosslinking reaction stage. In the grafting reaction, molecules suitable for crosslinking, for example, silane molecules, are grafted onto the polymer base, for example, polyethylene. Due to the better distribution of liquid, the grafting reaction will become more homogeneous, as a result of which the subsequent crosslinking proceeds extremely homogeneously and thus the quality of the end product is improved essentially.

An example is described below for both silane crosslinking and peroxide crosslinking. However, these examples are not to be construed as representing limitations.

| Silane crosslinking | |
| --- | --- |
| Starting material: | Spherilene |
| | density: 0.926 g/cm$^3$ |
| | MIFI 190° C./2.16 kp = 2.8 g/10 minutes |
| | bulk density: 370 g/L |
| Liquid additive: | vinyl trimethoxysilane |
| | dicumyl peroxide (DI-CUP) |
| | dibutylin-dilaurate (DBTDL) |
| | stabilizers |
| Mixture: | 98.2% Spherilene |
| | 1.8% liquid additive |
| Equipment: | gravimetric metering for Spherilene and liquid additive with mixer; extruder with a screw length of 25 D with good homogenization |
| Processing: | temperature profile on extruder 170, 190, 210, 220° C.; temperature profile on the tool 220–230° C. |
| Product: | cable with copper wire |

-continued

| Test results: | tensile strength according to ISO R 527: 21.4 Mpa<br>526% elongation at break according to ISO R 527;<br>thermal expansion according to ICE 811.2-1: 60%/0% |
|---|---|
| Peroxide crosslinking | |
| Starting material: | Spherilene<br>density: 0.926 g/cm³<br>MIFI 190° C./2.16 kp = 2.8 g/10 minutes<br>bulk density: 370 g/L |
| Liquid additive: | t-butyl-cumyl peroxide<br>antioxidant |
| Mixture A: | 1.0% t-butyl-cumyl peroxide<br>0.6% antioxidant<br>98.4% Spherilene |
| Mixture B: | 1.2% t-butyl-cumyl peroxide<br>0.6% antioxidant<br>98.2% Spherilene |
| Mixture C: | 1.5% t-butyl-cumyl peroxide<br>0.6% antioxidant<br>97.9% Spherilene |
| Equipment: | Brabender/press |
| Processing: | 10 minutes in Brabender at 140° C.<br>12 minutes in press at 120 bar and 190° C. |
| Product: | plate |
| Test results for Mixture A: | tensile strength according to ISO R 527:<br>20.3 Mpa;<br>elongation at break according to ISO R 527:<br>566%;<br>thermal expansion according to ICE 811.2-1:<br>125%/15% |
| Test results for Mixture B: | tensile strength according to ISO R 527:<br>25.2 Mpa;<br>elongation at break according to ISO R 527:<br>562%;<br>thermal expansion according to ICB 811.2-1:<br>45%/0% |
| Test results for Mixture C: | tensile strength according to ISO R 527:<br>26.0 Mpa;<br>elongation at break according to ISO R 527:<br>575%;<br>thermal expansion according to ICE 811.2-1:<br>25%/0% |

What is claimed is:

1. Process for the preparation of a crosslinked, extruded polymeric product, comprising the steps:

(a) selecting a solid, non-pelletized polymer granulate or a polymer powder having a fissured, porous surface;

(b) blending said polymer granulate or polymer powder in combination with a liquid additive which contains a crosslinker adjacent the inlet of an extruder to form a liquid-solid mixture; and (c) immediately passing said liquid-solid mixture into said extruder to intimately mix the liquid and solid materials.

2. Method according to claim 1, characterized by the fact that polyethylene is used for crosslinking.

3. Method according to claim 1, characterized by the fact that a polymeric material with a density of 0.89 to 1 g/cm³ and a grain size of 10 µm to 2 mm is used for crosslinking.

4. Method according to claim 1, characterized by the fact that the polymer granulate or polymer to be crosslinked and having a fissured, porous surface is introduced through an inlet device into a mixing zone, into which at least one liquid additive is injected for crosslinking the polymer and then the mixture is processed in a subsequent extrusion press device.

5. Method according to claim 2 characterized by the fact that the polyethylene granulate or polyethylene powder having a fissured, porous surface is crosslinked with the addition of a hydrolyzable, unsaturated silane via a silanol condensation reaction.

6. Method according to claim 2 characterized by the fact that the polyethylene granulate or polyethylene powder with fissured, porous surface is crosslinked with a radical reaction with the addition of a peroxide.

7. Process according to claim 1 characterized by the fact that the polymer granulate/polymer powder is introduced into a mixing device which is provided between the inlet line for the polymer and the extrusion press device and is mixed in this mixing device with at least one liquid additive introduced through an inlet line.

8. Process according to claim 7, characterized by the fact that the polymer granulate/polymer powder and the introduced liquid additive are mixed with a stirring device provided in the mixing device.

9. Process according to claim 1 characterized by the fact that the polymer granulate/polymer powder is mixed with at least one liquid additive introduced through an inlet device, whereby the introduction of the additive is done between the inlet device for the polymer and the extrusion press device.

10. Method according to claim 2, characterized by the fact that a polymeric material with a density of 0.89 to 1 g/cm³ and a grain size of 10 µm to 2 mm is used for crosslinking.

11. Method according to claim 3, characterized by the fact that the polymer granulate or polymer to be crosslinked and having a fissured, porous surface is introduced through an inlet device into a mixing zone, into which at least one liquid additive is injected for crosslinking the polymer and then the mixture is processed in a subsequent extrusion press device.

12. Method according to claim 5, characterized by the fact that the polyethylene granulate or polyethylene powder having a fissured, porous surface is crosslinked with the addition of a hydrolyzable, unsaturated silane via a silanol condensation reaction.

13. Method according to claim 5, characterized by the fact that the polyethylene granulate or polyethylene powder with fissured, porous surface is crosslinked with a radical reaction with the addition of a peroxide.

14. Process according to claim 4, characterized by the fact that the polymer granulate/polymer powder is introduced into a mixing device which is provided between the inlet line for the polymer and the extrusion press device and is mixed in this mixing device with at least one liquid additive introduced through an inlet line.

15. Process according to claim 5, characterized by the fact that the polymer granulate/polymer powder is introduced into a mixing device which is provided between the inlet line for the polymer and the extrusion press device and is mixed in this mixing device with at least one liquid additive introduced through an inlet line.

16. Process according to claim 6, characterized by the fact that the polymer granulate/polymer powder is introduced into a mixing device which is provided between the inlet line for the polymer and the extrusion press device and is mixed in this mixing device with at least one liquid additive introduced through an inlet line.

17. Process according to claim 2, characterized by the fact that the polymer granulate/polymer powder is mixed with at least one liquid additive introduced through an inlet device, whereby the introduction of the additive is done between the inlet device for the polymer and the extrusion press device.

18. Process according to claim 3, characterized by the fact that the polymer granulate/polymer powder is mixed with at least one liquid additive introduced through an inlet device, whereby the introduction of the additive is done between the inlet device for the polymer and the extrusion press device.

19. Process according to claim 4, characterized by the fact that the polymer granulate/polymer powder is mixed with at least one liquid additive introduced through an inlet device, whereby the introduction of the additive is done between the inlet device for the polymer and the extrusion press device.

* * * * *